(12) United States Patent
Burger

(10) Patent No.: US 9,752,483 B2
(45) Date of Patent: Sep. 5, 2017

(54) METHOD OF OPERATING A DOSING DEVICE

(71) Applicant: Robert Bosch GmbH, Stuttgart (DE)

(72) Inventor: Matthias Burger, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 15/075,739

(22) Filed: Mar. 21, 2016

(65) Prior Publication Data

US 2016/0201536 A1 Jul. 14, 2016

Related U.S. Application Data

(63) Continuation of application No. 14/385,491, filed as application No. PCT/EP2013/051537 on Jan. 28, 2013, now abandoned.

(30) Foreign Application Priority Data

Mar. 15, 2012 (DE) .................. 10 2012 204 107

(51) Int. Cl.
*F01N 9/00* (2006.01)
*F01N 3/20* (2006.01)
(Continued)

(52) U.S. Cl.
CPC ........... *F01N 3/208* (2013.01); *F01N 3/0253* (2013.01); *F01N 3/08* (2013.01); *F01N 3/2066* (2013.01);
(Continued)

(58) Field of Classification Search
CPC .... F02M 57/02; F02M 57/021; F02M 57/025; F02M 57/026; F02M 59/105;
(Continued)

(56) References Cited

U.S. PATENT DOCUMENTS 4,222,358 A 9/1980 Hofbauer
6,129,332 A 10/2000 Dusterhoft
(Continued)

FOREIGN PATENT DOCUMENTS

DE 10341996 3/2005
DE 102008010106 8/2009
(Continued)

OTHER PUBLICATIONS

International Search Report for Application No. PCT/EP2013/051537 dated May 8, 2013 (English Translation, 2 pages).
(Continued)

*Primary Examiner* — Jonathan Matthias
(74) *Attorney, Agent, or Firm* — Michael Best & Friedrich LLP

(57) ABSTRACT

A method of operating a dosing device. A dosing valve is provided with low-pressure and high-pressure chambers delimited by a piston whose travel is limited to a predefined maximum stroke. A pump operates to deliver the liquid at pre-delivery pressure. The dosing valve actuates under direction of a control unit by opening a 2/2 directional valve to direct the pumped liquid into the low-pressure chamber, and in response, the piston initiates a stroke. The liquid is injected from the high-pressure chamber into the exhaust-gas stream during the stroke of the piston, and the injection stops when the piston reaches maximum stroke. The control unit holds the directional valve open for longer than the piston requires to perform its maximum stroke so that the dosing valve delivers a predetermined volumetric dose of the liquid into the exhaust-gas stream, the predetermined volumetric dose corresponding directly to the maximum stroke of the piston.

15 Claims, 2 Drawing Sheets

(51) Int. Cl.
  *F01N 3/08* (2006.01)
  *F01N 3/025* (2006.01)
  *F01N 3/36* (2006.01)

(52) U.S. Cl.
  CPC ............... *F01N 3/36* (2013.01); *F01N 9/002* (2013.01); *F01N 2610/14* (2013.01); *F01N 2610/1433* (2013.01); *F01N 2610/1453* (2013.01); *F01N 2900/16* (2013.01); *Y02T 10/24* (2013.01); *Y10T 137/85978* (2015.04)

(58) Field of Classification Search
  CPC .... F02M 61/04; F02M 61/042; F02M 61/045; F02M 61/08; F02M 61/20; F01N 3/0253; F01N 3/2066; F01N 3/208; F01N 3/36; F01N 2610/146
  See application file for complete search history.

(56) References Cited

U.S. PATENT DOCUMENTS

| | | | |
|---|---|---|---|
| 6,513,497 | B1 | 2/2003 | Mahr |
| 2004/0035397 | A1 | 2/2004 | Magel |
| 2004/0237930 | A1 | 12/2004 | Kawamura et al. |

FOREIGN PATENT DOCUMENTS

| | | |
|---|---|---|
| DE | 102009032487 | 1/2011 |
| DE | 102010028866 | 11/2011 |
| DE | 102010028979 | 11/2011 |
| DE | 102010030343 | 12/2011 |
| DE | 102011078850 | 1/2013 |
| WO | 02092998 A1 | 11/2002 |

OTHER PUBLICATIONS

Office Action from the United States Patent and Trademark Office for U.S. Appl. No. 14/385,491 dated Oct. 19, 2015 (13 pages).

Final Office Action from the United States Patent and Trademark Office for U.S. Appl. No. 14/385,491 dated Feb. 18, 2016 (10 pages).

METHOD OF OPERATING A DOSING DEVICE

CROSS-REFERENCE TO RELATED APPLICATIONS

This application claims priority to U.S. patent application Ser. No. 14/385,491, filed Sep. 15, 2014, which is a U.S. national phase of PCT/EP2013/051537, filed Jan. 28, 2013, which claims priority to German Patent Application DE 10 2012 204 107.9, filed Mar. 15, 2012, the contents of all of which are incorporated by reference herein.

BACKGROUND OF THE INVENTION

The present invention relates to a dosing device for introducing a liquid medium into an exhaust-gas stream of an internal combustion engine of a motor vehicle.

For internal combustion engines, adherence to limit values for pollutant emissions in the exhaust gas is a legal requirement. In the case of a diesel vehicle in particular, nitrogen oxide reduction is imperatively necessary. One possibility for nitrogen oxide reduction is, for example, the known method of selective catalytic reduction (SCR). In said system, a liquid reducing agent, for example a urea-water solution, is introduced into the exhaust-gas stream in the exhaust pipe. With the hot exhaust gas, ammonia gas is generated from the urea-water solution, by means of which ammonia gas the nitrogen oxide, which is harmful to health, is reduced to form non-hazardous water and nitrogen.

DE 10 2010 28 866 A1 has disclosed a device for introducing the urea-water solution into the exhaust-gas stream. The urea-water solution is pressurized by means of an electrically driven pump. The injection itself is controlled by way of the electric actuation of a dosing valve. Owing to the electric actuator means, the dosing valve must generally be cooled. In the case of said system, a gas mixer is generally necessary in order to ensure a homogenous distribution of the urea-water solution.

A dosing device known from DE 10 2011 078 850 A1, which constitutes a subsequent publication, is controlled by pressure waves. A valve needle of a dosing valve is held closed by means of a spring holder and automatically opens above a certain hydraulic pressure. The injection is thus controlled by way of the pressure wave that is generated by means of a pump. The metering accuracy of said system is not particularly high because the injection quantity is dependent on a profile of the pressure wave with respect to time, and said pressure wave form is influenced by external influences.

SUMMARY OF THE INVENTION

The present invention differs from the prior art in that the dosing device has a 2/2 directional valve which is arranged in a delivery line between the pump and a first low-pressure chamber of the dosing valve. The dosing device according to the invention can be switched by means of the 2/2 directional valve. The 2/2 directional valve exhibits only two states: either it is open or it is closed.

The required pressure for the liquid medium is generated by the pump, preferably by a pre-delivery pump, wherein no particularly great requirements have to be imposed on the pump, in particular with regard to a build-up of pressure. However, the pump should be capable of building up a delivery pressure of approximately 9 bar. Since the 2/2 directional valve and the pump are components of simple construction, the dosing device can be produced at low cost. Here, the 2/2 directional valve may be an integral constituent part of the dosing valve; it may however also be connected to the dosing valve via a line.

In a preferred embodiment, it is provided that the dosing valve has at least one low-pressure chamber and at least one high-pressure chamber, and that the low-pressure chamber and the high-pressure chamber are delimited by a piston. Here, the pistons of the at least one low-pressure chamber and at least one high-pressure chamber have different piston diameters in each case. That pressure chamber of the dosing valve which is the first pressure chamber downstream of the pump or downstream of the 2/2 directional valve as viewed in the flow direction is preferably the low-pressure chamber.

A (stepped) piston is arranged in displaceable fashion between the low-pressure chamber and the high-pressure chamber. That part of the piston which delimits the low-pressure chamber has a larger diameter than that part of the piston which delimits the high-pressure chamber. The (stepped) piston is preferably of unipartite form.

Owing to the different piston diameters, a hydraulic pressure intensification action is realized which can advantageously generate very high injection pressures with simultaneously high delivery quantities. The high pressure that can thus be generated serves for the injection of the liquid medium into the exhaust pipe. Here, the liquid medium can be atomized to form very small droplets, and rapid mixture formation with high quality can be achieved even over extremely short mixing paths. A check valve is arranged between the low-pressure chamber and the high-pressure chamber.

The dosing device according to the invention, in particular the dosing valve, is of relatively simple construction, which imposes no special requirements on the manufacturing technology used. Accordingly, it is for example possible for all of the guides to be ground in one working step without re-chucking. The dosing device according to the invention is thus inexpensive to produce and operates reliably.

It is also advantageous for a delivery volume of the dosing device according to the invention to be constant. This is realized primarily by means of defined upper and lower stops for the (stepped) piston in the low-pressure chamber and/or in the high-pressure chamber. The end stops structurally define the delivery volume. Adherence to predefined exhaust-gas limit values in the exhaust pipe is thus ensured. Furthermore, the system is OBD-2 compliant. This is to be understood to mean the capability for the SCR system to be monitored during the operation of the internal combustion engine, and thus for functionality to be ensured over the entire service life of the internal combustion engine.

It is furthermore advantageous for the dosing device to have at least one exchangeable spacer device for defining a piston stroke in at least one pressure chamber. Here, it is for example possible for at least one stop of the piston to be altered by the exchangeable spacer device, in order that the piston stroke and thus the delivery quantity of liquid medium can be adapted to different internal combustion engines or exhaust-gas devices, and accurately defined. By means of spacer devices of different thickness, it is also possible for tolerance-induced scatter in a mass production context to be compensated. The spacer device may in this case be designed, for example, as an annular disk (for example a so-called residual air gap disk) which is positioned relative to a fixedly arranged stop in the interior of the dosing valve.

The disk may also bear against the housing of the dosing valve such that the stroke movement of the piston is limited by the disk. Through the selection of the thickness of the disk, the piston stroke can be correspondingly defined, wherein an assortment of disks of different thickness offers a selection with which the delivery volume of dosing valves of the same type of construction can be easily modified and adapted to different internal combustion engines or exhaust-gas devices. In this way, the construction of the dosing device can be standardized and used in substantially all exhaust-gas devices.

In one embodiment, it is provided that the dosing device according to the invention injects a liquid reducing agent, for example urea-water solution, for nitrogen oxide reduction into the exhaust-gas stream. In this way, the dosing device according to the invention is part of a known method for selective catalytic reduction (SCR). Here, the dosing valve is arranged upstream of an SCR catalytic converter as viewed in the exhaust-gas flow direction.

In a further embodiment, it is alternatively or additionally provided that the dosing device according to the invention, if required, injects diesel fuel for particle filter regeneration into the exhaust-gas stream. In this way, the dosing device according to the invention is part of a known method for the removal of soot particles at the particle filter of a diesel engine. For this purpose, the dosing valve is arranged in the exhaust pipe upstream of an oxidation catalytic converter.

It is furthermore advantageous for a housing of the dosing valve to have cooling ducts. Here, the cooling ducts are preferably connected to the tank return line for the liquid medium. In this way, the quantity flowing back into a storage tank can be used for cooling purposes.

BRIEF DESCRIPTION OF THE DRAWINGS

Further features, possible uses and advantages of the invention will emerge from the following description of an exemplary embodiment of the invention, which is illustrated in the drawing. Here, all of the features described or illustrated form the subject matter of the invention individually or in any desired combination. In the drawing.

DETAILED DESCRIPTION

Figure 1:
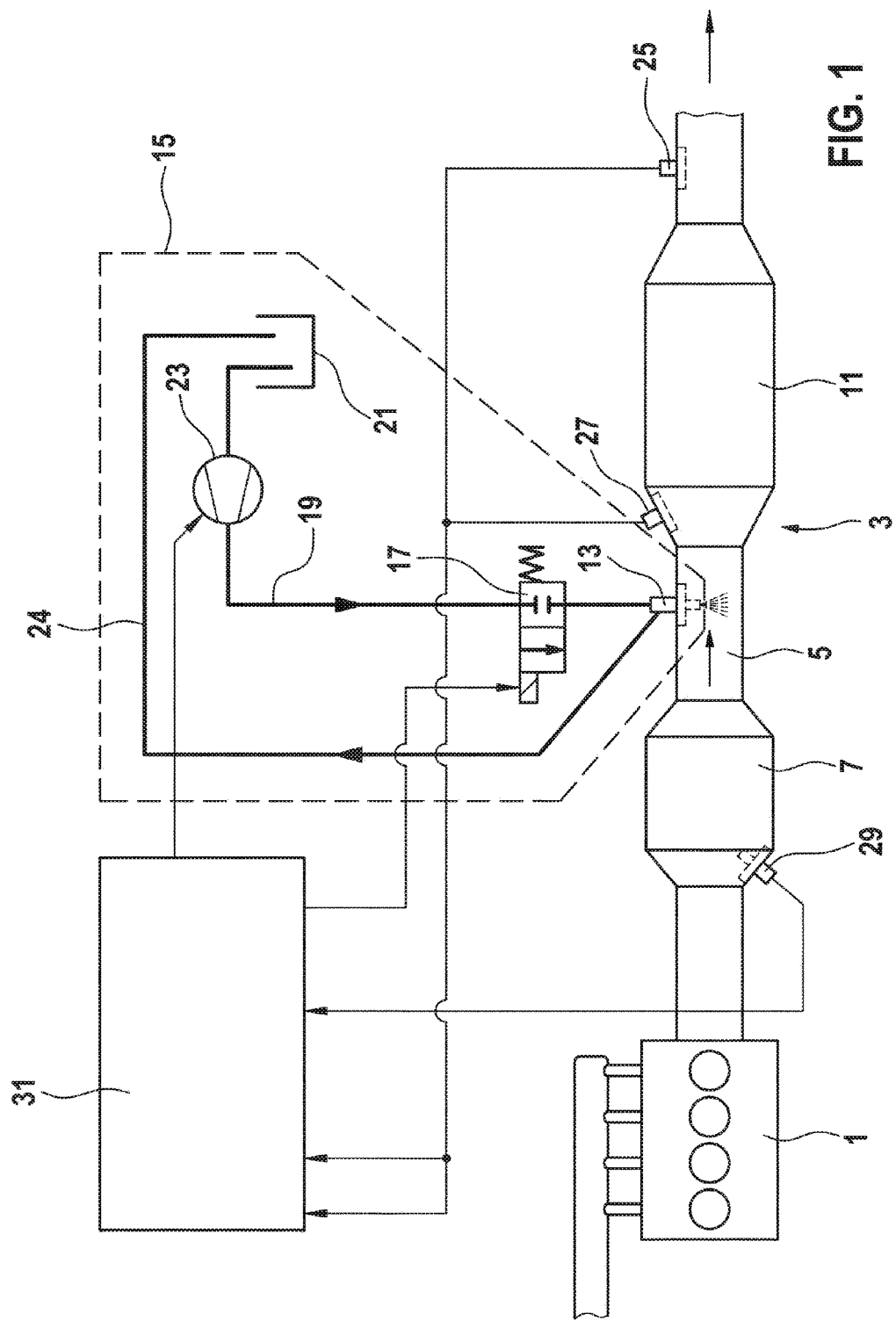
FIG. 1 shows the context of the invention.

FIG. 1 illustrates an internal combustion engine 1 with an exhaust-gas aftertreatment device 3 in highly simplified and schematic form, and shows the context of the invention. The exhaust-gas aftertreatment device 3 comprises an exhaust pipe 5, an oxidation catalytic converter 7 and an SCR catalytic converter 11 for the selective catalytic reduction of nitrogen oxide, which is harmful to health. The illustration does not show a particle filter, which is normally arranged downstream of the oxidation catalytic converter 7. The flow direction of the exhaust gas through the exhaust pipe 5 is indicated by arrows (without reference sign).

To supply a liquid reducing agent, for example a urea-water solution or some other liquid reducing agent, to the SCR catalytic converter 11, a dosing valve 13 for the urea-water solution is arranged on the exhaust pipe 5 upstream of the SCR catalytic converter 11. The dosing valve 13 injects the urea-water solution into the exhaust pipe 5 upstream of the SCR catalytic converter 11 when required, for example when a high concentration of nitrogen oxides in the exhaust gas is detected. With the hot exhaust gas, ammonia gas is generated from the urea-water solution, by means of which ammonia gas the nitrogen oxide, which is harmful to health, is reduced in the SCR catalytic converter 11 to form non-hazardous water and nitrogen.

The dosing valve 13 is part of a dosing device 15. The dosing device 15 furthermore comprises a 2/2 directional valve 17 which is arranged in a delivery line 19 between a pump 23 and the dosing valve 13. The delivery line 19 supplies urea-water solution to the dosing valve 13 from a storage tank 21. For the delivery of the urea-water solution, the delivery line 19 has a pump 23, preferably a pre-delivery pump, between the 2/2 directional valve 17 and the storage tank 21. The pre-delivery pump 23 should preferably be capable of generating a delivery pressure of approximately 9 bar. Furthermore, a return line 24 into the storage tank 21 for excess urea-water solution is connected to the dosing valve 13. The 2/2 directional valve 17 may—as illustrated in FIG. 1—be arranged in the delivery line 19, though may also be integrated in the dosing valve 13 (integrated dosing module IDM).

For the sake of completeness, reference is also made to sensors arranged in the exhaust-gas aftertreatment device 3, specifically a nitrogen oxide sensor 25 and temperature sensors 27 and 29. The sensors shown here, however, constitute merely a certain exemplary selection, wherein yet further sensors may be arranged in the region of the exhaust pipe 5 in the real operating situation.

The sensors 25, 27 and 29 and the pre-delivery pump 23 and the 2/2 directional valve 17 are connected by way of signal lines (without reference sign) to a control unit 31. The control unit 31 may also comprise multiple control units in a distributed arrangement.

Figure 2:
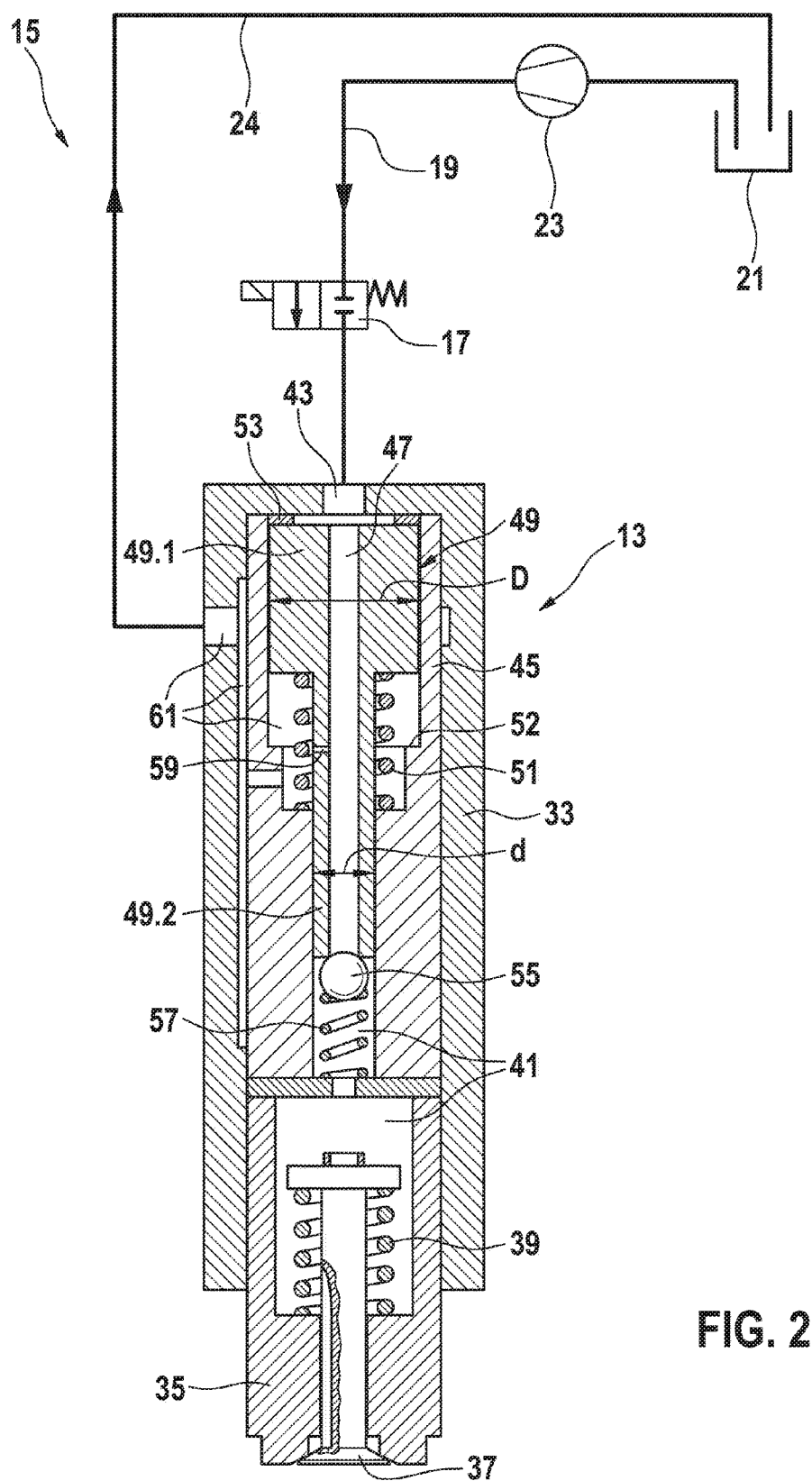
FIG. 2 shows a dosing device according to the invention in detail.

FIG. 2 shows the dosing device 15 according to the invention, in particular the dosing valve 13, in detail. The dosing device 13 is enclosed by a housing 33, out of which a nozzle body 35 projects.

An outwardly opening nozzle needle 37 is guided in the nozzle body 35. The nozzle needle 37 closes the nozzle body 35 under the action of the spring force of a nozzle closing spring 39. The nozzle needle 37 opens when the pressure in a high-pressure chamber 41 of the dosing valve 13 is of such a magnitude that the hydraulic forces acting on the nozzle needle 37 are greater than the forces of the nozzle closing spring 39 that act on the nozzle needle 37 in the closing direction.

Between the nozzle body 35 and a hydraulic port 43 for the delivery line 19, the housing 33 encloses a cylinder 45. The delivery line 19 issues, directly downstream of the port 43 in the cylinder 45, into a low-pressure chamber 47, which in turn is delimited by a hollow-bored piston 49. The hollow chamber of the piston 49 is part of the low-pressure chamber 47.

The piston 49 can be moved counter to the spring force of a restoring spring 51 under the action of the delivery pressure in the delivery line 19. The restoring spring 51 is arranged coaxially with respect to a reduced-diameter section 49.2 of the piston 49. A step in the cylinder 45 serves as a stroke stop 52 for the piston 49.

A residual air gap disk 53 is arranged as a spacer between the port 43 and the piston 49, said residual air gap disk being arranged fixedly in the interior of the housing 33. Here, the residual air gap disk 53 limits the stroke movement of the piston 49. By way of the thickness of the residual air gap disk 53, a volume of the low-pressure chamber 47, and a possible stroke of the piston 49, can be set at the assembly stage.

In the section 49.2 of the piston 49, the low-pressure chamber 47 is closed with respect to the high-pressure chamber 41 by a ball 55 of a check valve. Here, the ball 55 is pressed against an opening of the low-pressure chamber 47 by a compression spring 57, counter to the action of the pressure in the low-pressure chamber 47. The ball 55 is thus the valve element of a check valve between low-pressure chamber 47 and high-pressure chamber 41.

A diameter D of the piston 49 in the low-pressure chamber 47 in the region of the port 43 of the delivery line 19 is greater than the diameter d of the piston 49 that is subjected to pressure by the high-pressure chamber 41. In this way, in the dosing valve 13, by means of the delivery pressure of the pump 23 acting in the region of the port 43, hydraulic pressure intensification from the low-pressure chamber 47 to the high-pressure chamber 41 can be realized.

By means of a throttle 59 arranged in the section 49.2 of the piston 49, the urea-water solution can be returned into the storage tank 21 via a return chamber 61.

The dosing valve 13 functions as follows:

The dosing valve 13 is supplied with urea-water solution from the storage tank 21 via the delivery line 19. The 2/2 directional valve 17 arranged in the delivery line 19 is, during operation, either open or closed. The corresponding position is specified by the control unit 31.

When the 2/2 directional valve 17 is opened, the pressure in the low-pressure chamber 47 is raised to the pre-delivery pressure (approximately 9 bar) generated by the pump 23. Because the return chamber 61 is permanently connected to the return line into the storage tank 21 and is at ambient pressure, a resultant force acts on the piston 49 in the low-pressure chamber 47. Said resultant force pushes the piston 49 downward, which ultimately results in an increase of pressure of the urea-water solution in the high-pressure chamber 41.

If the pressure built up in the high-pressure chamber 41 exceeds the spring force of the nozzle closing spring 39, the nozzle needle 37 opens counter to the force of the nozzle closing spring 39, and the urea-water solution is injected until the piston 49 has reached its lower stroke stop 52. When the end position is reached, the delivery into the high-pressure chamber 41 is ended.

The 2/2 directional valve 17 is subsequently closed. As a result, the pressure in the low-pressure chamber 47 and in the high-pressure chamber 41 falls, and the nozzle needle 37 closes.

The force of the restoring spring 51 pushes the piston 49 upward until the latter has reached its end position. Owing to the upward movement of the piston 49, the pressure in the high-pressure chamber 41 falls to a value below the pressure level in the low-pressure chamber 47, and the ball 55 of the check valve opens. In this phase, the high-pressure chamber 41 is refilled with the displaced volume from the low-pressure chamber 47. Owing to the pressure intensification, a greater volume is displaced in the low-pressure chamber 47 than can be received in the high-pressure chamber 41. The excess urea-water solution is discharged via the throttle 59 into the return line 24.

With every stroke of the piston 49, the dosing valve 13 according to the invention always delivers an exactly defined volume. This is ensured by virtue of the fact that the 2/2 directional valve 17 is open for longer than the piston 49 requires to perform its maximum stroke. In this way, the dosing valve 13 can be operated volumetrically. In this way, for example in the context of on-board diagnosis, a time for the injection of the known delivery quantity can be determined in the control unit 31, and it can thus be ensured that predefined exhaust-gas limit values are adhered to in the exhaust pipe 5. The stroke of the pressure intensifier can be set exactly by way of the thickness of the residual air gap disk 53, wherein the residual air gap disk 53 simultaneously defines the upper end position of the piston stroke.

In an embodiment that is not illustrated, the housing 33 may comprise cooling ducts which are connected to the return line 24. In this way, the quantity of urea-water solution flowing back into the storage tank 21 can be used for cooling purposes.

In a further embodiment that is not illustrated, the storage tank 21 may be filled with diesel fuel. In this way, the dosing device 15 can be used for the regeneration of the particle filter in the exhaust pipe 5. In particular in the case of large diesel engines, it is for example the case that a burner is provided upstream of the particle filter and of the oxidation catalytic converter 7, which burner, when required, generates a flame which serves to evaporate the fuel additionally injected into the exhaust gas. This exhaust-gas/fuel mixture reacts in intensely exothermic fashion in the oxidation catalytic converter 7. As a result, the exhaust gas reaches the high temperature required for the regeneration of the particle filter. For this purpose, the dosing valve 13 is arranged in the exhaust pipe 5 upstream of the oxidation catalytic converter 7. This embodiment may be implemented in addition to or alternatively to the injection of urea-water solution upstream of the SCR catalytic converter 11.

What is claimed is:

1. A method of operating a dosing device (15) for introducing a liquid medium into an exhaust-gas stream of an internal combustion engine (1) of a motor vehicle, the method comprising:
   providing a dosing valve (13) with at least one low-pressure chamber (47) and at least one high-pressure chamber (41), wherein the low-pressure chamber (47) and the high-pressure chamber (41) are delimited by a piston (49) and a part of the piston which delimits the low-pressure chamber has a larger diameter than a part of the piston which delimits the high-pressure chamber, and the piston (49) travel is limited to a predefined maximum stroke;
   operating a pump (23) to deliver the liquid medium at a pre-delivery pressure into a delivery line (19);
   actuating the dosing valve (13) under direction of a control unit (31) by opening a 2/2 directional valve (17) along the delivery line (19) to direct the pumped liquid medium at the pre-delivery pressure into the low-pressure chamber (47) of the dosing valve (13), and in response, the piston (49) initiating a stroke; and
   injecting the liquid medium from the high-pressure chamber (41) into the exhaust-gas stream during the stroke of the piston (49), the injection stopping when the piston (49) reaches the maximum stroke,
   wherein the control unit (31) holds the 2/2 directional valve (17) open for longer than the piston (49) requires to perform its maximum stroke so that the dosing valve (13) delivers a predetermined volumetric dose of the liquid medium into the exhaust-gas stream, the predetermined volumetric dose corresponding directly to the maximum stroke of the piston (49).

2. The method of claim 1, wherein the injection is carried out until the piston (49) contacts a lower stroke stop (52) on a cylinder (45) within a housing (33).

3. The method of claim 2, further comprising returning the piston (49) along a return stroke until the piston (49) contacts a spacer device (53) positioned within the housing (33) to set the maximum stroke.

4. The method of claim 1, wherein, during the injection as the piston (49) strokes, the piston (49) compresses a check valve (55, 57) that is held in a closed position through the stroke of the piston (49).

5. The method of claim 1, further comprising opening a check valve (55, 57) when pressure in the low-pressure chamber (47) is higher than pressure in the high-pressure chamber (41) after the piston (49) is stroked to the maximum stroke, and re-closing the check valve (55, 57) when the pressure in the low-pressure chamber (47) is lower than the pressure in the high-pressure chamber (41).

6. The method of claim 1, wherein the liquid medium injected by the dosing device (15) is a liquid reducing agent for nitrogen oxide reduction.

7. The method of claim 1, wherein the liquid medium injected by the dosing device (15) is diesel fuel for particle filter regeneration.

8. The method of claim 1, further comprising placing a spacer device (53) into position within the housing (33) to set the maximum stroke of the piston (49).

9. A method of operating a dosing device (15) for introducing a liquid medium into an exhaust-gas stream of an internal combustion engine (1) of a motor vehicle, the method comprising:
   providing a dosing valve (13) with at least one low-pressure chamber (47) and at least one high-pressure chamber (41) within a housing (33), wherein the low-pressure chamber (47) and the high-pressure chamber (41) are delimited by a piston (49) and a part of the piston which delimits the low-pressure chamber has a larger diameter than a part of the piston which delimits the high-pressure chamber;
   setting a travel limit of the piston (49) to a predefined maximum stroke by selection of a spacer device (53) and insertion of the spacer device (53) into the housing (33);
   operating a pump (23) to deliver the liquid medium at a pre-delivery pressure into a delivery line (19);
   opening a 2/2 directional valve (17) along the delivery line (19) to direct the pumped liquid medium at the pre-delivery pressure into the low-pressure chamber (47) of the dosing valve (13), and in response, the piston (49) initiating a stroke;
   injecting the liquid medium from the high-pressure chamber (41) into the exhaust-gas stream only during the stroke of the piston (49) until the piston (49) contacts a lower stroke stop (52) within the housing (33); and
   maintaining the 2/2 directional valve (17) open until after the piston (49) contacts the lower stroke stop (52) so that the dosing valve (13) injects a predetermined volumetric dose of the liquid medium corresponding directly to the maximum stroke of the piston (49).

10. The method of claim 9, further comprising returning the piston (49) along a return stroke until the piston (49) contacts the spacer device (53).

11. The method of claim 9, wherein, during the injection as the piston (49) strokes, the piston (49) compresses a check valve (55, 57) that is held in a closed position through the stroke of the piston (49).

12. The method of claim 9, further comprising opening a check valve (55, 57) when pressure in the low-pressure chamber (47) is higher than pressure in the high-pressure chamber (41) after the piston (49) is stroked to the maximum stroke, and re-closing the check valve (55, 57) when the pressure in the low-pressure chamber (47) is lower than the pressure in the high-pressure chamber (41).

13. The method of claim 9, wherein the liquid medium injected by the dosing device (15) is a liquid reducing agent for nitrogen oxide reduction.

14. The method of claim 9, wherein the liquid medium injected by the dosing device (15) is diesel fuel for particle filter regeneration.

15. The method of claim 9, wherein the 2/2 directional valve (17) is opened as directed by a control unit (31) that does not manipulate the piston stroke of the dosing valve (13).

* * * * *